United States Patent
Reinhart

(10) Patent No.: US 11,001,324 B2
(45) Date of Patent: May 11, 2021

(54) LUGGAGE CONTAINER FOR FASTENING TO A VEHICLE, IN PARTICULAR TO A MOTORCYCLE

(75) Inventor: Peter Reinhart, Peissenberg (DE)

(73) Assignee: Bayerische Motoren Werke Aktiengesellschaft, Munich (DE)

(\*) Notice: Subject to any disclaimer, the term of this patent is extended or adjusted under 35 U.S.C. 154(b) by 969 days.

(21) Appl. No.: 13/232,693

(22) Filed: Sep. 14, 2011

(65) Prior Publication Data

US 2012/0000950 A1    Jan. 5, 2012

Related U.S. Application Data

(63) Continuation of application No. PCT/EP2010/002420, filed on Apr. 21, 2010.

(30) Foreign Application Priority Data

May 15, 2009 (DE) ............... 10 2009 021 529.8

(51) Int. Cl.
| | | |
|---|---|---|
| B62J 7/00 | (2006.01) | |
| B60R 9/00 | (2006.01) | |
| B62J 9/00 | (2020.01) | |
| E05B 77/48 | (2014.01) | |
| E05B 81/24 | (2014.01) | |
| B62J 9/20 | (2020.01) | |

(52) U.S. Cl.
CPC . *B62J 9/00* (2013.01); *B62J 9/20* (2020.02); *E05B 77/48* (2013.01); *E05B 81/25* (2013.01)

(58) Field of Classification Search
CPC .............. B62J 9/00; E05B 77/48; E05B 81/06

USPC ................ 224/413, 431, 435, 447, 569; 70/262–264

See application file for complete search history.

(56) References Cited

U.S. PATENT DOCUMENTS

| | | | |
|---|---|---|---|
| 4,726,203 A | 2/1988 | Komuro | |
| 4,907,428 A * | 3/1990 | Nakashima | B62J 9/00 180/219 |
| 5,439,149 A * | 8/1995 | Walter | B62J 9/00 190/117 |

(Continued)

FOREIGN PATENT DOCUMENTS

| | | |
|---|---|---|
| DE | 10 2006 014 929 A1 | 10/2006 |
| EP | 1 384 658 A2 | 1/2004 |

(Continued)

OTHER PUBLICATIONS

International Search Report dated Jul. 14, 2010 with English translation (six (6) pages).

(Continued)

*Primary Examiner* — Nathan J Newhouse
*Assistant Examiner* — Lester L Vanterpool
(74) *Attorney, Agent, or Firm* — Crowell & Moring LLP

(57) ABSTRACT

A luggage container for fastening to a vehicle, particularly to a motorcycle, including a first locking device which can adopt a release position in which the luggage container can be opened, and a locking position, in which an opening of the luggage container is locked. The luggage container has a second locking device which can adopt a locking position, in which an opening of the luggage container can be locked even if the first locking device is in its release position.

17 Claims, 2 Drawing Sheets

(56) References Cited

U.S. PATENT DOCUMENTS

| | | | | |
|---|---|---|---|---|
| 5,638,712 | A * | 6/1997 | Kuroda | B60R 25/04 70/264 |
| 5,896,768 | A * | 4/1999 | Cranick | E05B 77/48 200/4 |
| 6,481,605 | B1 * | 11/2002 | Visenzi | B62J 9/00 190/117 |
| 6,513,689 | B2 * | 2/2003 | Vincenzo | B62J 9/00 224/412 |
| 6,631,835 | B2 * | 10/2003 | Fang | B62J 9/20 224/413 |
| 6,793,110 | B2 * | 9/2004 | Hamilton | B62J 9/00 224/413 |
| 6,974,059 | B2 * | 12/2005 | Aiderman | B62H 5/001 224/413 |
| 7,196,612 | B2 * | 3/2007 | Sumada | G07C 9/00182 340/5.72 |
| 7,218,276 | B2 | 5/2007 | Teranishi | |
| 2001/0030438 | A1 | 10/2001 | Kamemizu et al. | |
| 2002/0034321 | A1 | 3/2002 | Saito et al. | |
| 2006/0112746 | A1 * | 6/2006 | Thompson | E05B 65/0075 70/257 |
| 2006/0220406 | A1 | 10/2006 | Misaki et al. | |
| 2007/0039957 | A1 * | 2/2007 | Shulz | B60R 9/00 220/210 |
| 2007/0214849 | A1 | 9/2007 | Yoshitake et al. | |
| 2008/0141742 | A1 * | 6/2008 | Stuckey | E05B 85/10 70/224 |
| 2008/0178642 | A1 | 7/2008 | Sanders | |
| 2010/0065596 | A1 | 3/2010 | Lim | |
| 2010/0077804 | A1 * | 4/2010 | Takeuchi | E05B 41/00 70/57.1 |
| 2010/0077807 | A1 * | 4/2010 | Takeuchi | B60R 11/00 70/158 |
| 2011/0037277 | A1 * | 2/2011 | Visenzi | E05B 17/0037 292/58 |

FOREIGN PATENT DOCUMENTS

| | | |
|---|---|---|
| EP | 1 921 001 A1 | 5/2008 |
| JP | 63-57190 U | 4/1988 |
| JP | 2004-361186 A | 12/2004 |
| JP | 2008-230293 A | 10/2008 |

OTHER PUBLICATIONS

German Search Report dated May 6, 2010 with partial English translation (nine (9) pages).

* cited by examiner

LUGGAGE CONTAINER FOR FASTENING TO A VEHICLE, IN PARTICULAR TO A MOTORCYCLE

CROSS-REFERENCE TO RELATED APPLICATIONS

This application is a continuation of PCT International Application No. PCT/EP2010/002420, filed Apr. 21, 2010, which claims priority under 35 U.S.C. § 119 from German Patent Application No. DE 10 2009 021 529.8, filed May 15, 2009, the entire disclosures of which are herein expressly incorporated by reference.

BACKGROUND AND SUMMARY OF THE INVENTION

The present invention relates to a luggage container for fastening to a vehicle, in particular, to a motorcycle.

From EP 1 384 658 A2, a central locking system for luggage containers of motorcycles is known where a voltage supply device for supplying the locking device with electric voltage is provided on or in the luggage container. The technical background of the present invention also includes U.S. Pat. No. 4,726,203, DE 10 2006 014 929 A1, as well as U.S. Pat. No. 4,907,428.

It is an object of the invention to create a luggage container for fastening to a vehicle, which luggage container can be locked "centrally", i.e. from the vehicle, in a simple manner, in which case the "central locking system" should be as maintenance-free as possible.

This and other objects are achieved by a luggage container, for fastening to a vehicle, particularly to a motorcycle, having a first locking device which can adopt a release position, in which the luggage container can be opened, and a locking position, in which an opening of the luggage container is locked. The luggage container has a second locking device which can adopt a locking position, in which an opening of the luggage container can be locked even if the first locking device is in the release position.

The term "luggage container" should be understood to have a very broad meaning and especially, but not exclusively, comprises motorcycle side cases and so-called "top cases". The invention can be used particularly in the motor-cycle field. However, in principle, the invention can also be used in the case of multi-wheel vehicles, for example, trikes or also in the case of automobiles. The luggage container has a first locking device which can adopt a release position and a locking position. In the locking position, an opening of the luggage container is always locked. A necessary but not sufficient prerequisite for opening the luggage container is the fact that the first locking device is in the release position.

The basic idea of the invention consists of a "central locking system" where no electric or electronic systems need to be provided on or in the luggage container. The invention provides a second locking device, which can also be called a "master locking device". The second locking device can also adopt a release position or a locking position. A characteristic feature of the invention is the fact that an opening of the luggage container can be locked by the second locking device, specifically even when the first locking device is in the release position. The luggage container can be opened when the first and the second locking device are each in their respective release position.

According to a further development of the invention, the second locking device has an "element" that can be operated from an exterior side of the luggage container. The term "element" should be interpreted extremely broadly. It may, for example, be a pin-type, stud-type or rod-type element that is arranged to be displaceable in the longitudinal direction. However, as an alternative to a displaceably arranged element, this may, for example, be a swivelably arranged element.

The element, which can be operated from the exterior side of the luggage container, may, for example, be pretensioned by a spring element in the direction of an initial position, in which the second locking device is in its release position. It may further be provided that, by operating the element, which can be operated from the exterior side of the luggage container, against the force exercised by the spring, the second locking device can be moved into its locking position.

According to a further development of the invention, the element, which can be operated from the exterior side of the luggage container, cooperates with an actuator arranged on the vehicle. The actuator may, for example, be an electric servomotor, a hydraulic piston, a pneumatic piston or the like.

It may be provided that the element, which can be operated from the exterior side of the luggage container, touches the actuator or rests on the actuator or purely mechanically interacts with the actuator in a different manner, as soon as the luggage container is fastened to a holding device of the motorcycle or has locked into a holding device of the motorcycle. The actuator may, for example, be triggered by an electronic system of the vehicle. It is contemplated, for example, that a key button or the like is provided at the vehicle, by whose operation the element, which can be operated from the exterior side of the luggage container, can be switched by way of the actuator from an initial position to an operating position or vice-versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
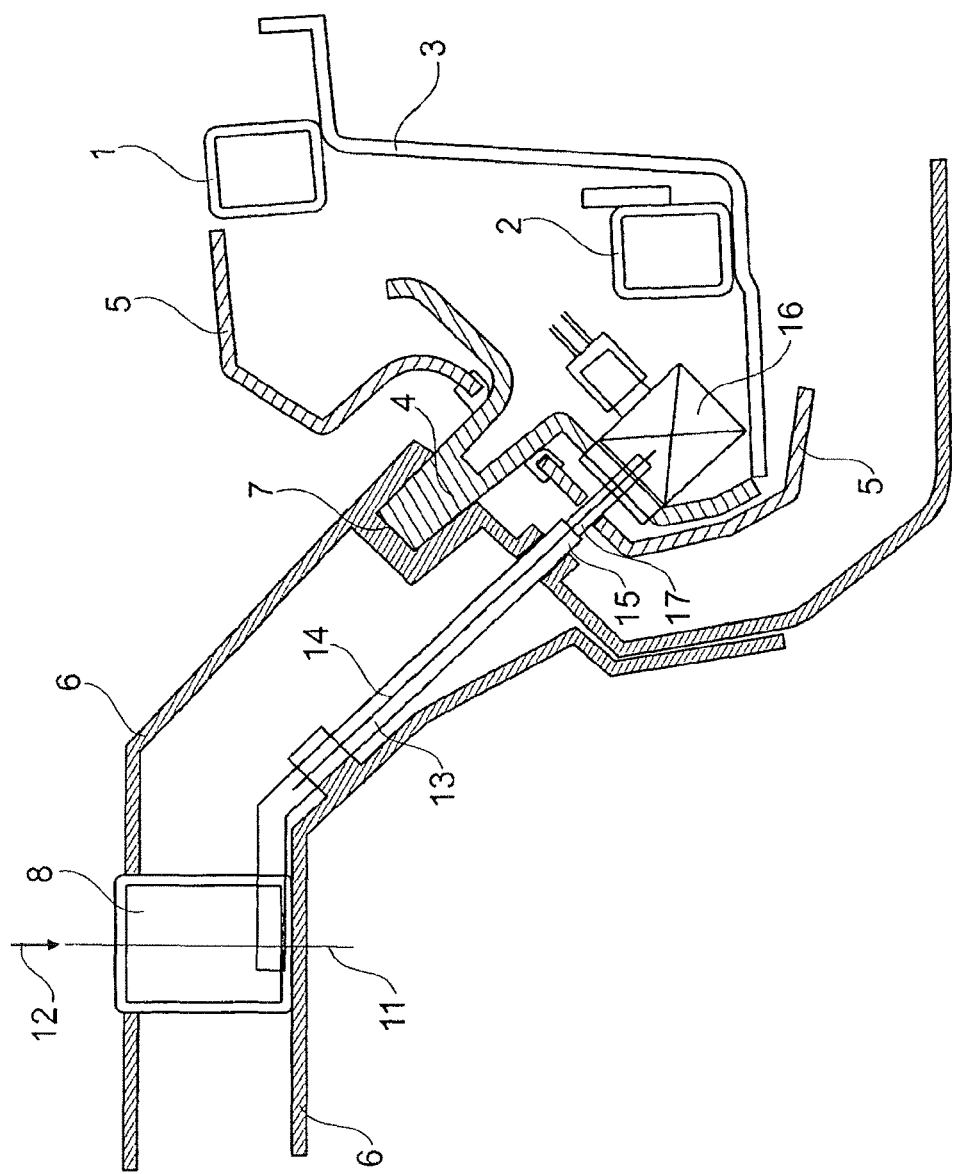
FIG. 1 is a partial cross-sectional view of a side case arranged in the rearward side region of a motor cycle.

FIG. 1 is a partial cross-sectional view of a side case arranged in the rearward side region of a motorcycle. Here, only two side members 1, 2 as well as one rear member 3, are visible of the motorcycle. Diagonally laterally upward-projecting hook-type elements are provided on the frame of the motorcycle, of which only one hook-type element 4 is visible here. Furthermore, partial regions of the motorcycle are covered by a covering 5.

A side case 6 is arranged laterally on the motorcycle, which side case 6 has recesses 7 which are designed in a fashion complementary with respect to the hook-type elements 4. The side cases 6 are placed diagonally from above with their recesses 7 on the hook-type elements or are suspended at the latter.

The motorcycle case 6 has a lid element, which is not shown here in detail and is swivelably connected with a base element. The motorcycle case 6 can be locked by means of a first locking device. A closing cylinder 8 (compare FIG. 2), which can be moveably operated by a key (not shown) optionally into a release position (open) or into a locking position 10 (lock), is a central component of the first locking device. The closing cylinder 8 is arranged to be displaceable in a longitudinal direction 11. When the closing cylinder 8 is in its release position, the luggage container can be opened by pressing the closing cylinder 8 downward in the direction of the arrow 12.

In addition to the first locking device, a second locking device is provided, which can also be called a "master locking device". The second locking device has a locking mechanism which is provided at the side case 6 and which, in a simplifying manner, is illustrated here as a locking rod 13 displaceable in a longitudinal direction 14. The locking rod 13 is pretensioned by a spring (not shown here in detail) in the direction of its initial position shown in FIG. 1, in which one end 15 of the locking rod 13 projects a distance out of the motorcycle case 6.

An electromagnetic actuator 16, which has an armature 17 displaceable in the longitudinal direction, interacts with the locking rod 13. The actuator 16 is fixedly arranged on the motorcycle; i.e. it remains on the motorcycle when the side case is removed from the motorcycle.

Thus, the frontal end 15 of the locking rod 13 rests against the frontal end of the armature 17. The armature 17 can take up two positions, specifically, a retracted position (compare FIG. 1) and an extended position, in which the locking rod 13 is displaced slightly in the direction of the closing cylinder 8. The extended position is the "locking position" of the second locking device. If the second locking device is in its locking position, the luggage container 6 cannot be opened even if the first locking device, i.e. the closing cylinder 8, is in the release position.

Figure 2:
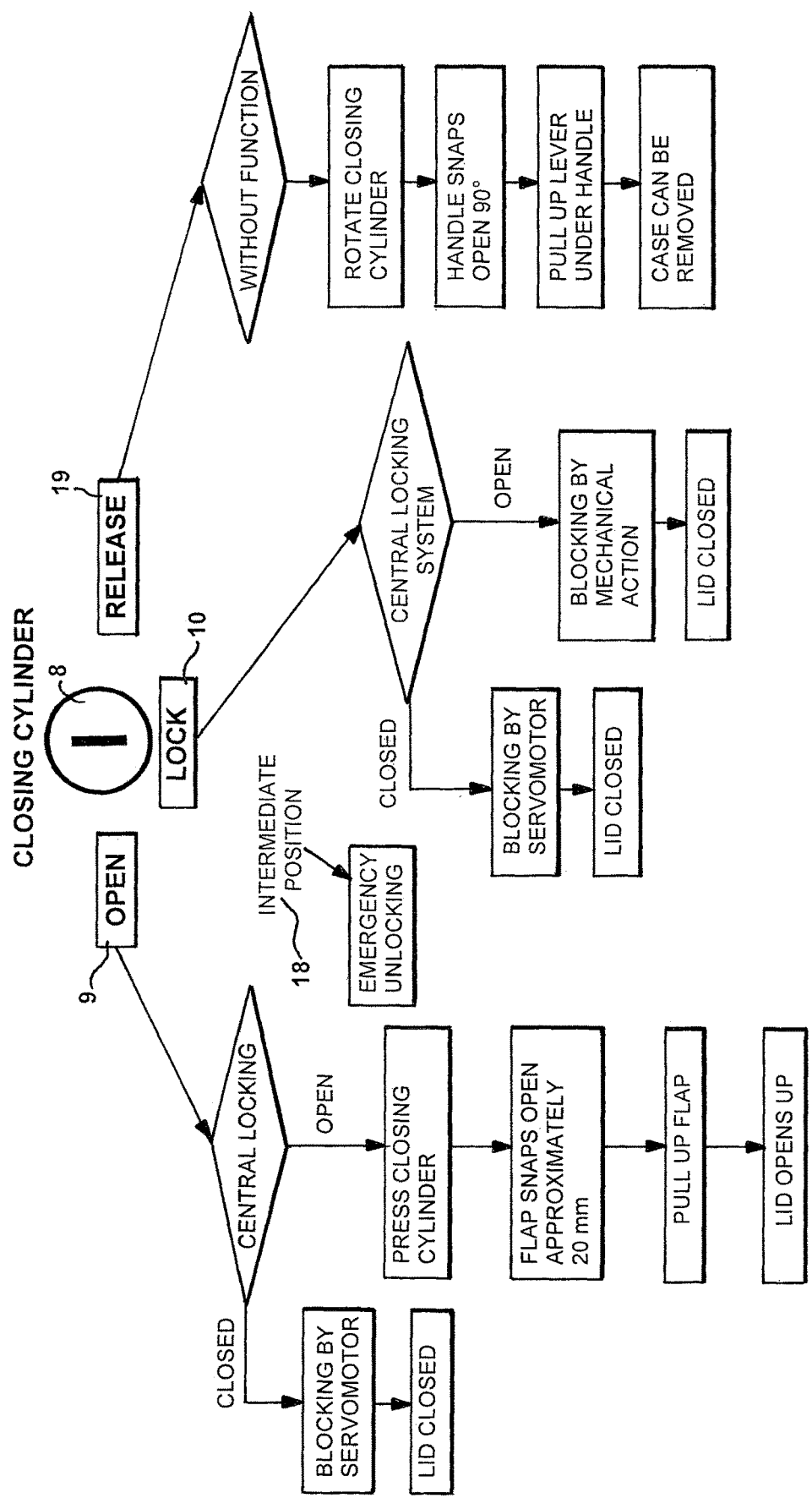
FIG. 2 is a diagram for explaining the functional logic of a central locking system according to an embodiment of the invention.

If, in contrast, the armature 17 is in the retracted position illustrated in FIG. 1, which corresponds to the release position of the second locking device, the luggage container 6 can be opened if the first locking device, i.e. the closing cylinder, is in the open position 9 (compare FIG. 2).

When the luggage container 6 is removed from the motorcycle, the locking rod 13 will automatically be displaced into its release position by means of the spring not shown here in detail. In the release position, the second locking device will therefore no longer have any influence on the first locking device. Whether the luggage container 6 can then still be opened or not will depend only on the position of the first locking device.

The "engineering logic" illustrated in FIG. 2 again explains the basic principle of the arrangement illustrated in FIG. 1.

If the first locking device is in the locking position (lock) 10, the luggage container cannot be opened, specifically independently of whether or not:

a) the luggage container 6 is fastened to the vehicle, and whether b) the "central locking system"; i.e. the second locking device, is situated in the release position or in the locking position.

In principle, it is a necessary but insufficient prerequisite for opening the luggage container that the first locking device is in the opening position 9. If the second locking device (central locking system) is then in the locking position, the luggage container can nevertheless not be opened. Rather, the luggage container 6 can always be opened only if, in addition, the "central locking system", i.e. the second locking device, is in the release position.

In the case of the embodiment described in FIG. 2, in addition to the release position (open) 9 and the locking position 10, the locking device can also adopt an "intermediate position" 18 situated in-between, which permits an emergency unlocking and an emergency opening respectively of the luggage container 6, if the latter:

a) is fastened to the motorcycle, b) the second locking device is in the locking position, and c) the second locking device has failed, i.e. can no longer be switched back into the release position.

By means of the key, the closing cylinder can be moved into the intermediate position 18, in which the luggage container 6 can be opened by pressing the closing cylinder 8 in the direction of the arrow 12 (compare FIG. 1), specifically also when the second locking device is in the locking position.

For reasons of completeness, the so-called "release position" 19 should be mentioned, in which the luggage container 6 can be removed from the vehicle. If the luggage container 6 has been removed from the vehicle, the openability of the luggage container 6 depends exclusively on the first locking device. If the luggage container has been the removed, the latter can be opened if the first locking device is in the release position. However, in the locking position, the luggage container can then not be opened.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A luggage container fastenable to a vehicle, comprising:
   a case;
   a first locking device of the case having a release position in which the luggage container is openable, and a locking position in which the first locking device blocks opening of the luggage container and the luggage container is not openable; and
   a second locking device of the case having a locking position in which the luggage container is locked against opening and the luggage container is not openable even if the first locking device is in the release position,
   wherein in the locking position of the first locking device, the luggage container is not openable even if the second locking device is not in the second locking device locking position.

2. The luggage container according to claim 1, wherein the second locking device has a release position in which the luggage container is openable if the first locking device is also in its release position.

3. The luggage container according to claim 1, wherein the second locking device comprises an operating element operable from an exterior side of the luggage container.

4. The luggage container according to claim 2, wherein the second locking device comprises an operating element operable from an exterior side of the luggage container.

5. The luggage container according to claim 3, wherein the operating element is pretensioned via a spring element in a direction of an initial position in which the second locking device is in its release position.

6. The luggage container according to claim 5, wherein the second locking device is moveable into its locking position via the operating element starting from the initial position against a spring force exercised by the spring element.

7. The luggage container according to claim 3, wherein the operating element is arranged to be displaceable in a displacing direction.

8. The luggage container according to claim 6, wherein the operating element is arranged to be displaceable in a displacing direction.

9. The luggage container according to claim 5, wherein the operating element projects from the luggage container in the initial position.

10. The luggage container according to claim 8, wherein the operating element projects from the luggage container in the initial position.

11. The luggage container according to claim 3, wherein the operating element is configured as one of a pin-type, stud-type and rod-type element.

12. The luggage container according to claim 1, wherein the luggage container is a motorcycle luggage container is configured such that the luggage container is securable to a motorcycle.

13. A luggage container fastenable to a vehicle, comprising:
   a case;
   a first locking device of the case having a release position in which the luggage container is openable, and a locking position in which the first locking device blocks opening of the luggage container and the luggage container is not openable, and
   a second locking device of the case having a locking position in which the luggage container is locked against opening and the luggage container is not openable even if the first locking device is in the release position,
   wherein the first locking device comprises a closing cylinder.

14. The luggage container according to claim 13, wherein the closing cylinder is movable between the first locking device release position and the first locking device locking position via a key.

15. The luggage container according to claim 1, further comprising an operating device for opening the luggage container, the operating device having an inoperative initial position and an operating position, and being movable between the inoperative initial position and the operating position.

16. The luggage container according to claim 15, wherein the operating device comprises a closing cylinder provided on the luggage container.

17. The luggage container according to claim 16, wherein the closing cylinder is movable in a longitudinal direction between the inoperable initial position and the operating position in a direction toward an interior of the luggage container.

* * * * *